Patented Jan. 5, 1937

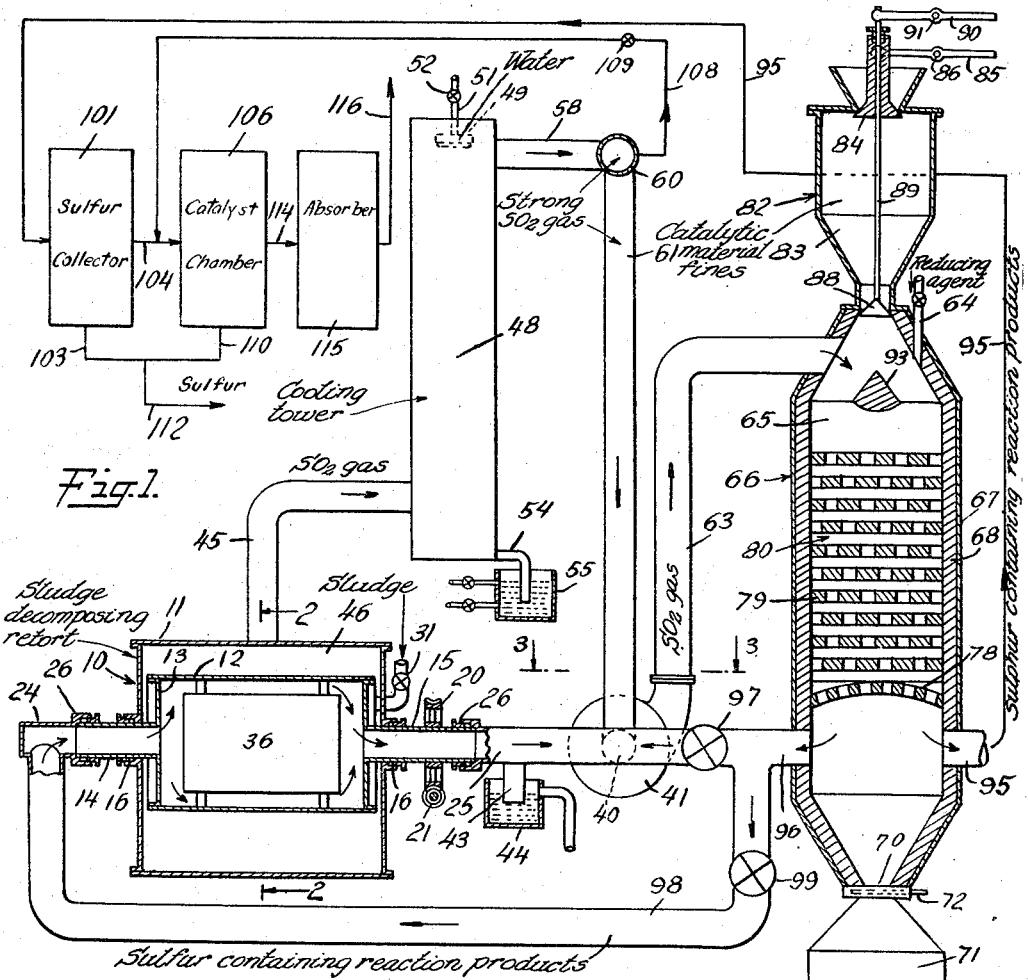

2,066,896

UNITED STATES PATENT OFFICE 2,066,896

REDUCTION OF SULPHUR DIOXIDE

Henry F. Merriam, West Orange, N. J., assignor to General Chemical Company, New York, N. Y., a corporation of New York Application December 31, 1934, Serial No. 759,866

11 Claims. (Cl. 23—226)

This invention relates to the production of elemental sulphur, and especially to the production of elemental sulphur from sulphur dioxide gas mixtures formed by the decomposition of acid sludges constituting waste products of oil refining processes in which sulphuric acid is employed. Although the invention is directed primarily to the production of elemental sulphur from sulphur dioxide formed by the decomposition of acid sludges, and for convenience is described in this connection, it is to be understood that the principles of the present improvements apply to the formation of hydrogen sulphide if such end product is desired.

Several processes have been suggested for the recovery, from acid sludges, of sulphur as sulphur dioxide. In general, prior operations involve decomposition of acid sludges by heating, with the production of gas mixtures containing sulphur dioxide, and accompanying formation of solid carbonaceous residue of varying composition. It has been proposed to utilize the sulphur dioxide thus produced in the manufacture of sulphuric acid by the contact process. Processes for the production of elemental sulphur from sulphur dioxide gas mixtures, by reacting the sulphur dioxide at elevated temperatures with carbonaceous reducing agents, have also been suggested. Prior methods, however have been such as to require the consumption of relatively large amounts of fuel for the purpose of maintaining the high temperatures required in the reducing reaction.

In previous processes for the production of elemental sulphur by reduction of sulphur dioxide gas by reducing agents, difficulties in providing methods of commercial nature have been caused largely by the low sulphur dioxide concentration of the sulphur dioxide gas mixtures involved, such low concentrations requiring the use of relatively large amounts of fuel, and elaborate apparatus to accommodate the immense volumes of gas handled per unit of sulphur recovery. By decomposing acid sludges according to certain methods, gas mixtures of high sulphur dioxide concentration may be formed. Hence, it has been proposed to produce gas mixtures high in sulphur dioxide by decomposing acid sludges, and reacting the sulphur dioxide with reducing agents to form sulphur in an exothermic self-sustaining reaction.

The production of elemental sulphur by reduction of sulphur dioxide of concentrated sulphur dioxide gas mixtures is a highly exothermic reaction, and substantial quantities of heat over and above that required to maintain the reaction self-sustaining are generated. On the other hand, decomposition of acid sludges is an endothermic reaction necessitating utilization of large quantities of extraneous heat.

The principal object of the present invention is the provision of an economical method for decomposing acid sludges to form a gas mixture high in sulphur dioxide, and for the reduction of the sulphur dioxide to produce elemental sulphur. One important feature of the invention is the provision of a method by which substantial quantities of excess heat liberated during the reduction of sulphur dioxide to elemental sulphur may be utilized in the decomposition of acid sludge.

One preferred embodiment of the process of the invention comprises the decomposition by external heating of acid sludge, substantially in the absence of air or other diluting gas, to form a gas mixture containing a comparatively large volume of water vapor, a lesser quantity of sulphur dioxide, relatively small amounts of carbon dioxide and hydrocarbon vapors, together with solid carbonaceous residues containing little or no undecomposed sulphuric acid. The gas mixture thus produced is cooled to around normal temperatures to condense and remove from the gas stream the bulk of the water vapor and condensable hydrocarbons. Because of the absence of air or other diluting gases, the condensing operation increases the sulphur dioxide concentration of the exit gas stream of the gas cooler to values as high as 85-95% by volume. The sulphur dioxide of the gas stream is then reduced to elemental sulphur by reacting the sulphur dioxide and reducing agents with or without the aid of catalysts.

The reduction reaction is initiated at temperatures of say not less than about 900° F., and hence the cooled gas stream is heated to this extent prior to introduction into the reduction zone. It is advantageous to preheat the gas stream before introduction into the reduction zone to reactive temperatures, e. g. not less than about 850° F., by recycling and admixing with the cool raw gas, hot reduction products from the reduction zone. This recycling and admixture of reduction products with the incoming sulphur dioxide gas stream serves to heat up the incoming gas stream to reactive temperature, and to dilute the incoming gas to such an extent as to avoid excessive temperature rises in the reduction chamber because of the exothermic reaction effected therein. When operating with relatively highly concentrated sulphur dioxide gas mixtures, as contemplated by the present invention, the amount of recycled reaction products required to heat up the incoming gas to reactive temperature, and to dilute the gas stream sufficiently to avoid excessive temperatures in the reduction chamber, raises the temperature of the gas stream as it enters the reduction chamber considerably above the initial optimum temperature, thus decreasing the permissive temperature rise in the converter during the reduction reaction. In the present method, portions of the hot reduction products are withdrawn from the recycling circuit, and cooled by utilizing heat of such withdrawn products to decompose further quantities of acid sludge, the cooled products being returned to the recycling circuit to provide adequate dilution of the gas stream entering the reduction zone. The sulphur dioxide gas mixture produced by decomposition of the sludge is added to and forms part of the main gas stream entering the sulphur dioxide reduction stage of the process. In this manner, proper temperature control may be maintained in the reduction chamber, and substantial amounts of excess heat generated in the reducing reaction, but not needed for heating the cooled incoming gases to reactive temperature, may be effectively employed for decomposition of acid sludge.

The details, objects and advantages of the invention will be appreciated from the following description taken in connection with the accompanying drawing, in which Fig. 1 shows, partly in section and partly diagrammatic, apparatus in which the process of the invention may be carried out;

Fig. 2 is a vertical cross section approximately on the line 2—2 of Fig. 1, and

Fig. 3 is a plan taken approximately on the line 3—3 of Fig. 1.

Referring to the drawing, the reference numeral 10 indicates an acid sludge decomposing furnace comprising principally a casing 11 and a cylindrical drum 12. Fixed to the circular end members 13 of the drum are outwardly extending sleeves 14 and 15 journalled in gas-tight bearings 16 in the vertical end walls of casing 11, sleeve 15 carrying a gear 20 meshing with a worm gear 21 driven from a source of power, not shown. The ends of sleeves 14 and 15 are rotatably connected to the gas conduits 24 and 25 by gas-tight joints 26.

Extending longitudinally through the upper part of the casing and positioned adjacent the surface of drum 12 is an acid sludge distributor, of any appropriate design, indicated by reference numeral 30. Acid sludge is fed to the distributor through an inlet pipe 31 connected to a reservoir, not shown. A scraper 33, extending the length of the drum, is supported by the end walls of the casing, and is arranged to remove carbonaceous residue from the face of the drum, the residue dropping into a trough 34 for discharge from the casing 11 by a screw conveyor 35. Inside the drum is a cylindrical baffle member 36 which causes hot gases entering the drum through sleeve 14 to more or less impinge on the inner surface of the drum. The end of the gas conduit 25 remote from joint 26 opens into a pipe connection 40 which communicates with the suction side of the blower 41. Liquids condensing in conduit 25 may be withdrawn through an outlet 43, and collected in a receptacle 44.

One end of a gas line 45 opens into the interior of the acid sludge decomposing chamber 46 formed by the inside casing 11 and the outer surface of drum 12. Gas conduit 45 affords means for conducting the gases and vapors generated by decomposition of the acid sludge into the bottom of a cooling tower 48. The latter may be a vertical, cylindrical vessel provided at the top with a spray head 49 arranged to create in the tower a downwardly flowing spray of water or other cooling liquid. Water is introduced into the tower through a pipe 51 having therein a control valve 52. Water and condensates run out of the bottom of the tower through an outlet pipe 54 into a separating tank 55. After rising through the tower in countercurrent flow relation with the cooling liquid, cooled gases are discharged from the top of the tower through a pipe 58 and into a reaction gas inlet header 60, discharging gas into line 61, the opposite end of which opens into pipe connection 40 as shown in Fig. 3.

The outlet side of blower 41 communicates through conduit 63 with the top of reduction chamber 65 in a converter designated generally by reference numeral 66. The converter comprises preferably a cylindrical steel shell 67 having a firebrick lining 68. The lower end of the converter is funnel-shaped and communicates through an opening 70 with an outlet chamber 71 adapted to receive catalytic material discharged from the reaction chamber. Passage of material through opening 70 is controlled by a slide 72. Catalytic material may be withdrawn from the chamber 71 through an outlet 74 likewise controlled by a slide valve 75. It will be apparent that catalytic or other material may be discharged from the reduction chamber 65 without admitting air thereto. In the lower end of the reduction chamber 65 is a firebrick arch 78 supporting a plurality of baffles 79 constituting checkerwork 80. The baffles 79 are staggered and offset so that there are no vertical channels of appreciable length in the checkerwork. Accordingly, the gas passages through the checkerwork are circuitous, and catalytic material on the baffles presents a large surface to the gas stream flowing through the reaction chamber.

Finely divided catalytic material may be fed into the upper end of the reduction chamber 65 through a feed mechanism 82. The charging chamber 83 is provided with an inlet valve 84 operated by lever 85 pivoted at 86. Flow of material from chamber 83 into the reduction chamber 65 is controlled by a similar valve 88 on the lower end of rod 89 passing axially through valve 84, valve 88 being operated by a lever 90 pivoted at 91. Immediately beneath valve 88 is a cone 93 to facilitate distribution of catalytic material over the upper surface of the checkerwork 80.

Products of the reduction reaction effected in chamber 65 leave the latter through pipes 95 and 96. Although temperature control of the reducing reaction may be effected in various ways it is preferred, in the present invention, to obtain proper regulation, by recycling through the reduction chamber reduction products in quantities sufficient to obtain the desired temperature control. Hence, pipe 96 is connected to pipe 40; pipe 98, pipe 40, blower 41, pipe 63 and the reduction chamber constituting the recycling circuit. The amount of reduction products passing through pipe 96 directly into the recycling circuit is controlled by valve 97. To supply heat for decomposing sludge in furnace 10, part of the hot reduction products leaving the reaction chamber 65 pass through conduit 98, controlled by valve 99, to chamber 24, through sleeve 14 and into the drum 12 in the decomposed furnace.

Reduction products discharged from chamber 65, and not passed through drum 12 or recycled directly through line 63 by blower 41, flow through line 95 into a condenser or sulphur collector 101 which is preferably a waste heat boiler operating so as to condense the sulphur contained in the gas stream. Molten sulphur runs out of the bottom of the collector through an outlet 103.

Gases along with sulphur vapor uncondensed in collector 101 leave the latter through pipe 104 connected to the inlet of a catalyst chamber 106 constructed preferably so as to cause the gas stream to pass through one or more beds of catalytic material. To provide reacting proportions of reducing and reducible gases in chamber 106, sulphur dioxide gas may be by-passed from header 60 through conduit 108, controlled by valve 109, into connection 104. Since operations are preferably conducted so that elemental sulphur produced in chamber 106 is in the liquid condition, provision is made for withdrawing molten sulphur from the catalyst chamber through pipe 110 which, with pipe 103, conducts the liquid sulphur product of the process into a common sulphur outlet 112.

The gas outlet in catalyst chamber 106 is connected by conduit 114 with an absorber 115 which functions to separate traces of sulphur and sulphur compounds from the gas stream before discharging the latter into the atmosphere through stack 116.

The amount of waste heat recovered from the hot reduction products withdrawn from the recycling circuit and passed through the drum 12 is insufficient to decompose all of the acid sludge required in carrying out the process. Hence, it is to be understood the apparatus contemplated includes one or more additional decomposing furnaces, not shown, similar to furnace 10, but constructed to utilize, as a source of heat, hot combustion gases produced by burning any suitable type of fuel. Thus, furnace 10 and tower 48, shown in the drawing, are but one unit of a battery of decomposing units, all the cooling towers of which feed a concentrated sulphur dioxide gas into the inlet gas header 60. In the furnaces not shown, the sludge is preferably decomposed by indirect heating so that the sulphur dioxide gas mixture produced is not diluted with spent combustion gases.

The following illustrates one method of carrying out the improved process employing the apparatus described:

Sulphuric acid sludges resulting from the refining of oils vary widely in composition, one representative sludge was found to have a titratable acidity of about 50.8% expressed as $H_2SO_4$, and yielded on decomposition by destructive distillation about 28% residual coke, and a retort gas which, after cooling to about normal temperatures, produced about 6% condensable oils, about 35% water, the balance of the retort gas comprising sulphur dioxide, carbon dioxide, carbon monoxide, nitrogen and uncondensable hydrocarbons and water vapor. Although the invention is not dependent upon any particular method for the destructive distillation of the acid sludge to produce a sulphur dioxide gas mixture and carbonaceous residue, decomposition of the sludge is preferably effected by indirect heating of sludge in a furnace such as illustrated in the drawing.

Drum 12 is rotated through gear 20 in the direction of arrow 120 (Fig. 2), and a layer of acid sludge is spread over the outer surface of the drum by the distributor 30 to which acid sludge is supplied through pipe 31. Acid sludges may be decomposed by heating at relatively low temperatures, e. g., 300–600° F. Flow of hot reduction products through the drum and the rate of rotation of the drum are controlled so that decomposition of the acid sludge to the desired degree is substantially complete when the coke residue reaches knife 33, which scrapes residue from the surface of the drum into trough 34.

On heating, the sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, and carbon monoxide.

Preferably, decomposition of the sludge is effected at such relatively low temperatures as above noted, and under such conditions that decomposition proceeds only to approximately a point at which substantially all the sulphuric acid initially contained in the sludge is reduced. In this situation, the solid carbonaceous residues formed usually contain appreciable quantities of volatile matter, principally hydrocarbons, and in the case of some sludges the volatile matter content of the residue may run in excess of 38–40%. This volatile matter content of the residue is particularly effective as a reducing agent in the subsequent reduction of sulphur dioxide, and the coke-like residue may be used for this purpose if desired. In this circumstance, destructive distillation of the sludge is not preferably carried beyond the condition at which substantially all of the sulphuric acid is broken up. Coke produced by the above method and discharged from the furnace by conveyor 35 may analyze substantially as follows:

| | Per cent |
|---|---|
| Total acidity | 2.1 $H_2SO_4$ |
| Ash | 1.2 |
| Total volatile matter, including $H_2SO_4$ | 32.1 |
| Fixed carbon | 66.7 |

The gases formed in the chamber 46 by the decomposition of the sludge and discharged into pipe line 45 contain generally not substantially in excess of 20% by volume of sulphur dioxide, say 75–80% water vapor, and small quantities of hydrocarbon vapors and carbon dioxide. For example, when decomposing a sludge such as mentioned above, the gas mixture in line 45 may contain by volume about 18% sulphur dioxide, about 79.5% water vapor, and smaller amounts of hydrocarbon vapors and carbon dioxide. A gas stream of this nature flows through line 45 into the bottom of cooling tower 48, and is contacted therein with a downwardly flowing stream of water introduced into the head of the tower through pipe 51. The gas stream rising through the tower is cooled, and the bulk of the water and condensable hydrocarbon vapors of the retort gas stream is condensed, and runs out of the tower with the cooling liquid into tank 55, in which the water and oily liquids may be separated by decantation or otherwise. The quantity of water run through the tower is regulated by valve 52, so as to cool the gas to about say 100° F., at which temperature the gas stream enters exit pipe 58. When so operating, the cooling liquid runs out of tower 48 at temperatures of about 160–180° F., and at this temperature a minimum quantity of sulphur dioxide is absorbed and retained in the cooling liquid.

Since decomposition of the sludge is effected in furnace 10 substantially in the absence of air or other diluting gas, the gas mixture in header 60, after separation of water and condensable hydrocarbons, is rich in sulphur dioxide. The gas mixture thus formed usually contains by volume, in excess of about 43% and generally from 70 to 99% sulphur dioxide, the balance consisting chiefly of carbon dioxide, uncondensed water vapor, and a relatively small amount of hydrocarbon gases which may be employed as reducing agents in the subsequent reducing reaction. When working with the particular sludge mentioned, the gas mixture in header 60 may contain, for example, by volume, about 85% sulphur dioxide, 5.5% water vapor, 5% gaseous hydrocarbons, 1.2% carbon dioxide, 1.0% carbon monoxide, and 2.3% nitrogen originating in the nitrogen compounds present in the sludge. The amount of water vapor remaining in the gas will, of course, depend largely on the extent to which the gas is cooled to condense out water. Preferably, the gas is not completely dried, and the cooling in tower 48 should be so controlled as to leave in the gas, say 4 to 8% water by volume, since the presence of about this amount of water vapor appears to prevent formation of COS in the subsequent reducing operation effected in chamber 65.

As above noted, one or more other decomposing units, discharging sulphur dioxide gas into header 60, are operated similarly to furnace 10 and tower 48, the only material difference being that the heat for decomposing the acid sludge in such other furnace or furnaces is supplied by burning extraneous fuel, instead of utilizing waste heat of the subsequent reducing reaction. It will be understood that the spent combustion gases of such other furnaces are vented to the atmosphere, and are not permitted to mix with and dilute the sulphur dioxide gases formed. The sulphur dioxide gas produced as described contains little or no free oxygen (i. e. no more than one or two percent of free oxygen) and is sufficiently concentrated so that it may economically be reacted with reducing agents to produce elemental sulphur in a reduction reaction which is self-sustaining from a standpoint of heat balance. Where the sulphur dioxide concentration of the gas stream collecting in header 60 is high as noted, i. e., generally not less than about 43%, the cool gas stream may be heated to initial reactive temperature and diluted with reaction products to provide temperature control in the reduction chamber by admixture with hot products from the reduction chamber, as hereinafter described, without reducing the sulphur dioxide concentration of the gas stream entering the reduction chamber below the concentration, say about 13%, at which reduction reaction is self-sustaining, i. e. no extraneous heat need be supplied to effect the reduction reaction when such gas heated to reactive temperature is reacted with reducing material and by utilizing a gas substantially free of oxygen the efficiency of the process from the standpoint of fuel consumption approaches a maximum.

Reduction of sulphur dioxide may be effected in chamber 65 by reacting the sulphur dioxide with suitable reducing agents, either with or without catalysts. Any suitable reducing agent such as carbon, hydrocarbons, or hydrogen may be utilized to bring about reduction of sulphur dioxide to sulphur. When desired, the checkerwork in the reduction chamber may be bauxite brick which may, at high temperatures, act catalytically to promote the reaction of sulphur dioxide and reducing agents. Where it is advantageous to employ the latter in the form of a gas, a reducing agent, such as methane may be introduced into the reduction chamber through valve controlled inlet 64. In some instances, for example because of the nature of the sludge decomposed, the incoming gas stream in line 61 may contain substantial amounts of hydrocarbon gases. These hydrocarbons may be utilized in the reduction chamber as partial or total substitute for reducing material otherwise introduced through inlet 64.

A supply of catalytic material, such as bauxite fines, is maintained in the chamber 83 of the feed mechanism. Before reacting gases are admitted to the reaction chamber, the valve 88 is opened to permit admission to the converter of sufficient catalytic material to form on the top of each of the baffles small mounds of loosely associated catalytic material, any excess falling through the openings in the arch 78 and into the funnel-shaped bottom of the shell. The gas mixture containing sulphur dioxide, and the preferably gaseous reducing agent are charged into the upper end of the reduction chamber 65 and pass downwardly through the checkerwork 80. Because of the particular arrangement of the baffles comprising the checkerwork, there are provided numerous relatively large unobstructed gas passages through the reduction zone. At the same time, the baffling effect of the checkerwork is such as to cause repeated contacts of reacting gases with the large surfaces of catalytic material on the baffles. Because of the relatively rapid movement of the gas stream through the converter and the comparatively finely divided nature of the catalytic material, the latter may tend to drop gradually, though at a relatively low rate, through the reaction chamber, co-current with the flow of the gas stream. The catalytic material passing through arch 78 is collected in the lower end of the shell, and may be withdrawn from the apparatus, without permitting the admission of air to the converter, and returned to charging chamber 83. During operation, the inlet valve 88 may be opened from time to time as required to feed into the converter amounts of catalytic material corresponding to those withdrawn through discharge chamber 71. However, during operation, but little replacement of catalytic material is required.

Where the carbonaceous residue of furnace 10 is used as a reagent-catalyst, a supply of such material may be maintained in chamber 83, and continuously or intermittently fed into the top of the reduction chamber.

When using bauxite catalyst, the incoming gas stream in header 60 and pipe 61, at temperatures of about 100° F., may be preheated to temperatures of about 1000-1025° F., prior to introduction into reduction chamber 65. If the carbonaceous residue of furnace 10 is used as the reagent-catalyst, the gas may be heated to about 850° F. prior to introduction into chamber 65. Preheating of the gas stream, when the latter contains not less than about 43% sulphur dioxide, may be advantageously effected by withdrawing quantities of hot reaction products from chamber 65, at temperatures, for example of about 1100–1200° F., and introducing hot reaction products into the inlet side of the blower. The amount of hot reaction products thus fed into the incoming gas stream may be controlled by adjustment of valve 97 according to the particular operating conditions. Ordinarily, the admixture of about two to four volumes (standard conditions) of hot reaction products from the reducing zone with about one volume of incoming sulphur dioxide gas serves to raise the temperature of the resulting gas mixture in conduit 63 to preferably not less than about 850° F.

Admixture with the incoming sulphur dioxide gas of hot reduction products serves first, to heat up the incoming gas stream to reactive temperature, and second, to dilute the incoming gas stream to such an extent as to avoid excessive temperature rise in the reduction chamber because of the exothermic reaction effected therein. Under operating conditions contemplated by the present invention, for example where the gas in main 60 has a sulphur dioxide content appreciably in excess of about 43%, if the total amount of recycled reaction products needed to dilute the gas stream sufficiently to avoid excessive temperature rise in the reaction chamber were recycled directly through the recycling circuit comprising pipe 96, pipe 40, blower 41 and pipe 63, the temperature of the gas stream entering the reduction chamber would be above the optimum initial reduction temperature thus decreasing the permissive temperature rise during the reduction reaction in chamber 65.

By the present process, the excess heat contained in the recycled reduction products, withdrawn from chamber 65 through pipe 96, over and above that needed to preheat the incoming gas stream to initial reactive temperature is utilized in furnace 10 to decompose further quantities of acid sludge. Accordingly, in order to sufficiently dilute the reaction gas entering the top of the reduction chamber 65, without raising the initial reactive temperature to more than about 1000° F. or 850° F., (depending upon whether bauxite or carbonaceous residue of furnace 10 is used) by adjustment of valve 97 in line 96 a portion of the reaction products leaving the reaction chamber through pipe 96 is conducted through pipe 98 into the sleeve 14 of drum 12. The hot gases and vapors enter drum 12 at temperatures of about 1100–1200° F. Heat of the reduction products is utilized to decompose the acid sludge in the furnace 10, and the gases and vapors, cooled to about 700–800° F. or less, leave the interior of drum 12 through sleeve 15, and pass through conduit 25 and pipe connection 40 into the recycling circuit. These cooled gases and vapors serve to dilute the incoming sulphur dioxide gas stream from header 60 sufficiently to provide for proper temperature control in the reduction chamber, without raising the temperature of the gas stream on introduction into the reduction zone substantially above the optimum initial reactive temperature.

The amount of acid sludge which may be decomposed by means of excess heat generated in the reduction chamber depends on the sulphur dioxide concentration of the gas available. For example, when operating with an initial gas in header 60 containing about 84% sulphur dioxide and about 6.5% water vapor, sufficient heat is generated in the reducing reaction to heat up the incoming gas stream from about 100° F. to about 900° F. and leave an excess of about 60 B. t. u. per pound of sludge decomposed. As approximately 1000 B. t. u. are required for decomposition of one pound of sludge, it will be seen that about 6% of the total amount of acid sludge decomposed in the process may be decomposed in furnace 10 by means of excess heat generated in the reduction chamber.

As some of the sulphur contained in the stream of gases and vapors passing through the drum may condense in conduit 25, provision is made for withdrawing the same through pipe 43 into a suitable receptacle 44.

The reduction reaction taking place in chamber 65 is exothermic, and although reduction may be initiated at the low temperature of about 850° F., the temperature tends to rise rapidly. At high temperatures hydrogen sulphide in various quantities is likely to be formed, and accordingly, as it is desired to avoid formation of excessive amounts of hydrogen sulphide in the exit gases of the reaction chamber, the temperature of the reaction is preferably not permitted to exceed about 1200° F. Generally, operations are conducted so that the temperature of the products leaving the reaction chamber is about 1100–1200° F.

The exit gases and vapors of the reduction chamber contain sulphur generally as vapor, a relatively large amount of water vapor, appreciable amounts of carbon dioxide, and smaller quantities of sulphur dioxide, hydrogen sulphide, carbon monoxide and possibly some hydrocarbons. For example, the reduction products may contain by volume about 23% sulphur, 48.8% carbon dioxide, 1.5% carbon monoxide, 11.8% water, 2.3% sulphur dioxide, 6% hydrogen sulphide, 4.3% hydrocarbons, and 2.3% nitrogen.

That portion of the products of the reduction chamber not recycled by blower 41, flows through line 95 into the cooler or collector 101. As noted, the latter may be a waste heat boiler, and so operated as to cool the gas stream to about 300° F., the sulphur condensed in the collector being withdrawn from the collector through outlet 103.

The gas stream leaving cooler 101 through line 104 usually contains either reacting proportions of sulphur dioxide and hydrogen sulphide, or an excess of hydrogen sulphide. Should the latter condition prevail, necessary quantities of sulphur dioxide may be by-passed through pipe 108 into connection 104 to provide therein a gas mixture containing approximately reacting proportions of hydrogen sulphide and sulphur dioxide. This gas mixture is then introduced at temperatures generally not less than about 300° F. and preferably around 450–480° F. into chamber 106, and sulphur dioxide and hydrogen sulphide are reacted therein in the presence of a catalyst, preferably activated bauxite, to produce sulphur in accordance with the equation—

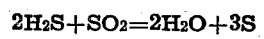

$$2H_2S + SO_2 = 2H_2O + 3S$$

Other catalysts such as iron oxide and pyrites cinder may be advantageously employed.

Preferably the reduction reaction taking place in chamber 106 should be so regulated as to avoid a temperature rise in the gas stream of more than about 300° F. Should conditions be such that the temperature of the reaction tends to rise to a greater extent, provision may be made for controlling the reaction temperature by circulating through chamber 106 suitable amounts of tail gases from stack 116. As will be observed, the reduction reaction in chamber 106 is conducted so that sulphur formed therein is in molten condition and runs out of the chamber through connection 110. The exit gases of the catalyst chamber flow through line 114 into an absorber 115, and are contacted with absorbing materials, such as activated carbon, silica gel or tarry oils, to remove the last traces of sulphur and sulphur compounds from the gas stream before the latter is discharged into the atmosphere from stack 116.

Heretofore, in the recovery of sulphur compounds from sludge obtained in the treatment of petroleum distillates with sulphuric acid or sulphuric anhydride, the sludge has been treated with steam or water in suitable retorts. This treatment results in the separation of the sludge into a tarry mass and a dilute, impure sulphuric acid which settles to the bottom of the treating vessel. In the art, this impure acid has been designated "weak acid" or "sludge acid". On the other hand, the term "acid sludge" has been utilized to define the acid mass obtained directly from the apparatus in which the petroleum distillates have been treated with sulphuric acid. It is to be understood that the present invention is applicable to the recovery of sulphur from both acid sludges and sludge acids, and also to the recovery of sulphur from other impure forms of sulphuric acid. In the appended claims the term "acid sludge" is intended to include acid sludge and sludge acid, and other impure forms of sulphuric acid.

I claim:

1. In the method of making reduction products of sulphur dioxide, the steps comprising effecting reduction of sulphur dioxide in an exothermic reducing reaction whereby heat is liberated, and utilizing liberated heat to effect production of sulphur dioxide in an endothermic reaction.

2. In the method of reducing sulphur dioxide, the steps comprising introducing sulphur dioxide into a reduction zone, reacting the sulphur dioxide with reducing agent to reduce sulphur dioxide whereby heat is liberated, and decomposing acid sludge, by liberated heat, to form a gas mixture containing sulphur dioxide.

3. In the method of making reduction products of sulphur dioxide, the steps comprising reacting sulphur dioxide with reducing agent at elevated temperatures to reduce sulphur dioxide, and passing hot reduction products in heat exchange relation with acid sludge to decompose the sludge and form sulphur dioxide.

4. In the method of making reduction products of sulphur dioxide, the steps comprising decomposing acid sludge to produce a sulphur dioxide gas mixture, forming a gas mixture having an increased sulphur dioxide concentration, reacting the sulphur dioxide with reducing material, and utilizing at least part of the heat generated to decompose further quantities of acid sludge to produce sulphur dioxide.

5. In the method of making reduction products of sulphur dioxide, the steps comprising decomposing acid sludge by heating to form a gas mixture containing sulphur dioxide, cooling the gas mixture to increase the sulphur dioxide concentration, heating the gas mixture to reactive temperature, reacting the sulphur dioxide with reducing material, and utilizing heat generated to heat incoming sulphur dioxide gas to reactive temperature and to decompose further quantities of acid sludge.

6. In the method of making reduction products of sulphur dioxide, the steps comprising decomposing acid sludge by heating to form a gas mixture containing sulphur dioxide, cooling the gas mixture to increase the sulphur dioxide concentration sufficiently to effect reduction of sulphur dioxide in a reaction generating excess heat, heating the gas mixture to reactive temperature, reacting the sulphur dioxide with reducing material, and utilizing heat generated to decompose further quantities of acid sludge.

7. In the method of reducing sulphur dioxide, the steps comprising forming a gas mixture having a sulphur dioxide concentration sufficient to effect reduction of sulphur dioxide in a reaction generating excess heat, heating the gas mixture to reactive temperature, introducing the gas mixture into a reduction zone, reacting the sulphur dioxide and reducing agent at elevated temperatures to reduce sulphur dioxide, and passing hot reduction products in heat exchange relation with incoming sulphur dioxide gas and with acid sludge to heat incoming gas to reactive temperature and to decompose acid sludge.

8. In the method of making reduction products of sulphur dioxide, the steps comprising forming a sulphur dioxide gas mixture, heating the gas mixture to reactive temperature, introducing the gas mixture into a reduction zone, reacting the sulphur dioxide, at elevated temperature, with reducing material to form sulphur dioxide reduction products, recycling at least part of the hot reduction products through the reduction zone to heat the incoming sulphur dioxide gas mixture to reactive temperature and to control the temperature in the reduction zone, and cooling at least part of the recycled reduction products by passing the same in heat exchange relation with acid sludge to decompose the sludge and produce sulphur dioxide.

9. The method of producing elemental sulphur which comprises decomposing acid sludge to form a gas mixture containing sulphur dioxide and condensable vapors, cooling the gas mixture to separate condensable vapors and form a gas mixture having a sulphur dioxide concentration sufficient to effect reduction of sulphur dioxide in a reaction generating excess heat, reacting, at elevated temperatures, the sulphur dioxide with reducing material to produce elemental sulphur, heating the incoming sulphur dioxide gas mixture to reactive temperature and controlling the temperature of the reducing reaction by introducing into the incoming sulphur dioxide gas mixture hot products from the reduction zone, passing at least some of the reduction products in indirect heat exchange relation with acid sludge to decompose the sludge to form further quantities of sulphur dioxide, and admixing the last mentioned reduction products with the gas stream entering the reduction zone.

10. The method which comprises decomposing acid sludge by heating to form sulphur dioxide gas, subjecting the gas to further treatment involving generation of heat, and utilizing heat generated to decompose further quantity of acid sludge.

11. The method of producing elemental sulphur which comprises decomposing acid sludge to form a gas mixture containing sulphur dioxide and condensable vapors, cooling the gas mixture to separate condensable vapors and form a concentrated sulphur dioxide gas mixture, reacting, at temperatures not substantially less than about 850° F. the sulphur dioxide with reducing material to form reduction products containing elemental sulphur, heating the incoming sulphur dioxide gas mixture to not less than about 850°

F., and maintaining the temperature in the reduction zone not substantially in excess of about 1200° F. by introducing into the incoming sulphur dioxide gas mixture products from the reduction zone, passing at least some of the hot reduction products in indirect heat transfer relation with a body of acid sludge to decompose the same and form sulphur dioxide, passing the sulphur dioxide thus produced into the reduction zone, and admixing the last mentioned reduction products with the gas stream entering the reduction zone.

HENRY F. MERRIAM.